April 18, 1933.  E. H. REMDE  1,904,984
INDUSTRIAL TRUCK
Filed March 18, 1930  7 Sheets-Sheet 1

INVENTOR
Edward H. Remde
BY
Geo. B. Pitts
ATTORNEY

April 18, 1933. E. H. REMDE 1,904,984
INDUSTRIAL TRUCK
Filed March 18, 1930 7 Sheets-Sheet 2
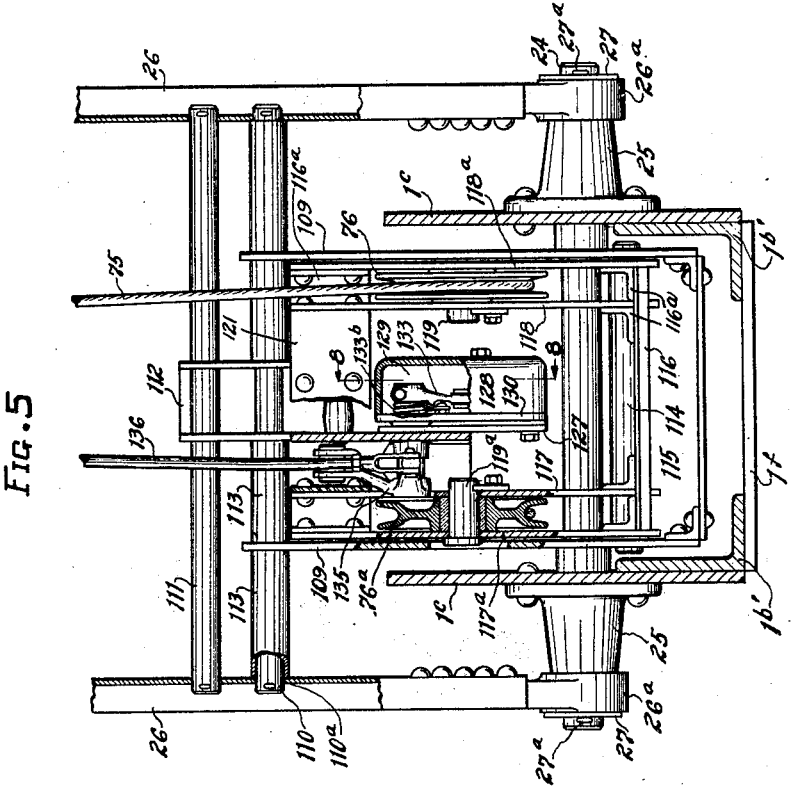
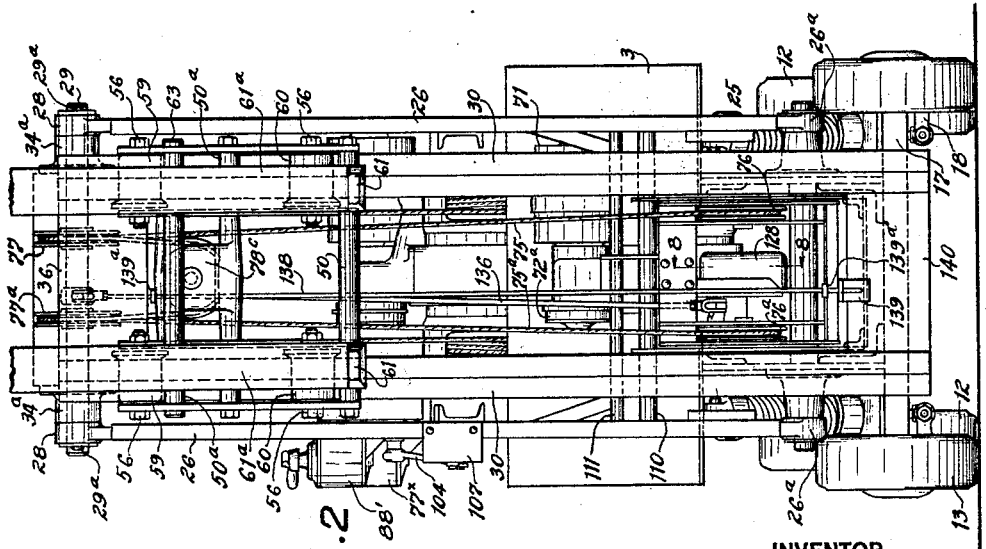
INVENTOR
Edward H. Remde
BY
Geo. B. Pitts
ATTORNEY April 18, 1933.  E. H. REMDE  1,904,984
INDUSTRIAL TRUCK
Filed March 18, 1930   7 Sheets-Sheet 3
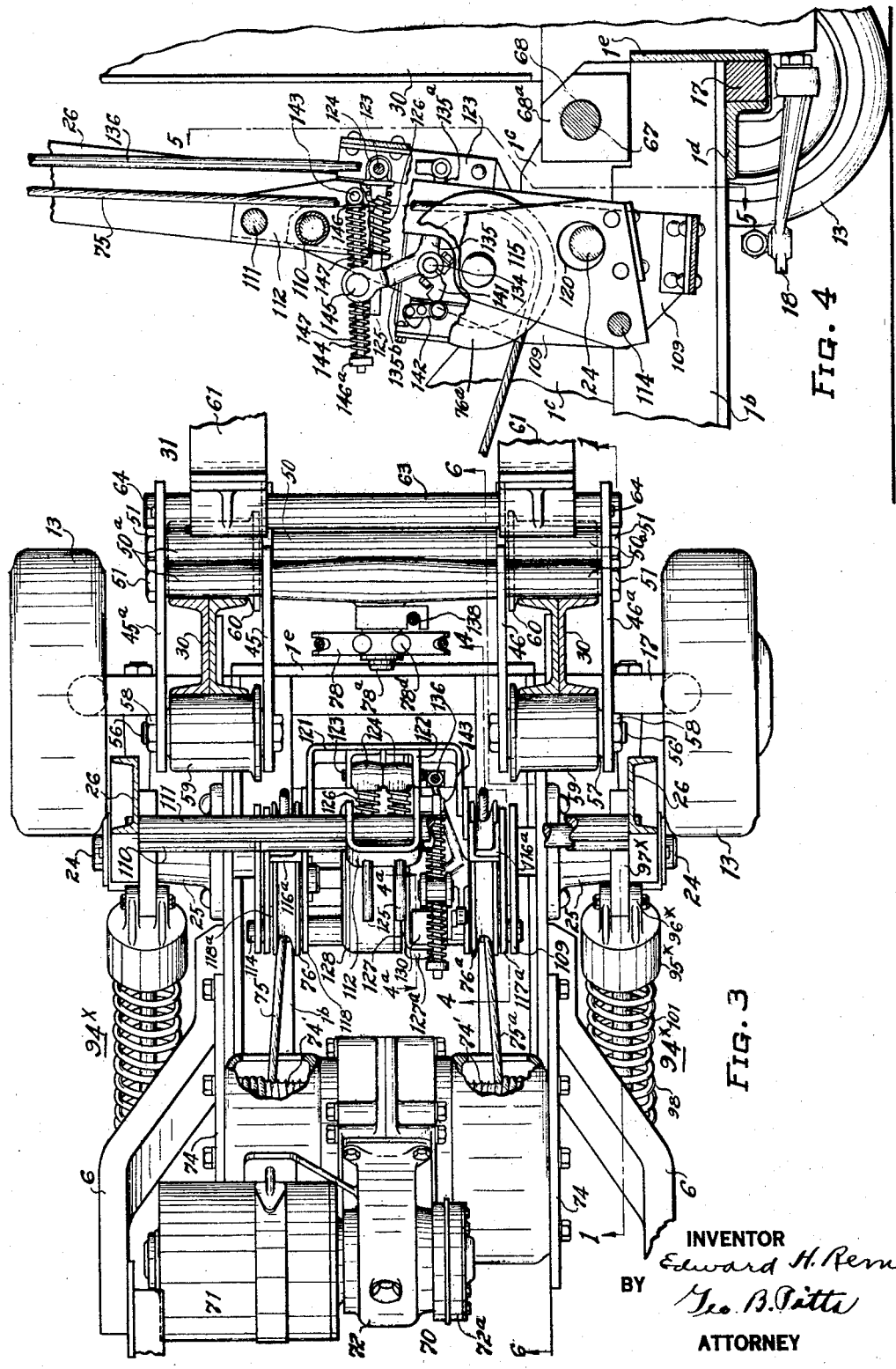

April 18, 1933.  E. H. REMDE  1,904,984
INDUSTRIAL TRUCK
Filed March 18, 1930  7 Sheets-Sheet 4
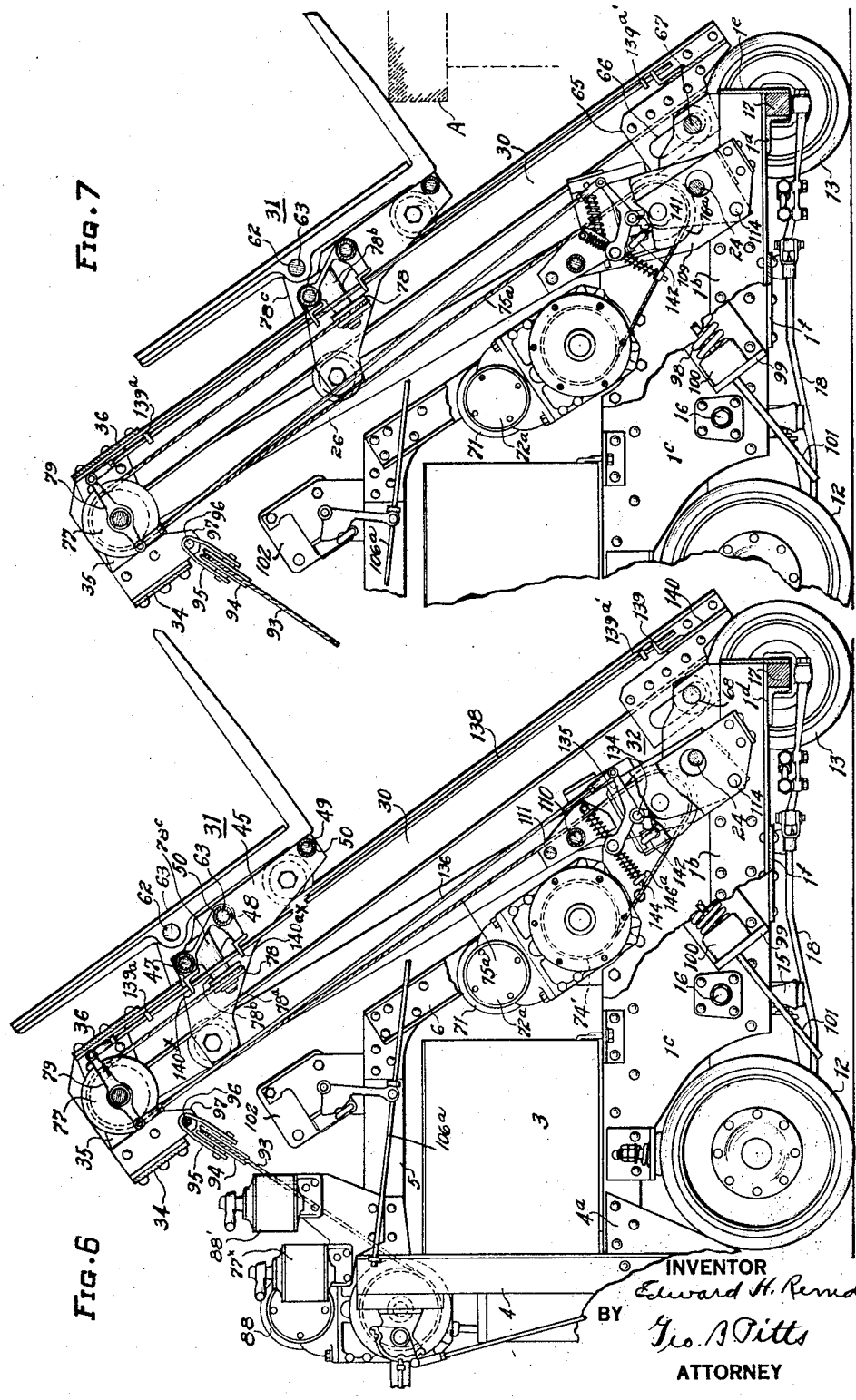

April 18, 1933.  E. H. REMDE  1,904,984
INDUSTRIAL TRUCK
Filed March 18, 1930   7 Sheets-Sheet 5
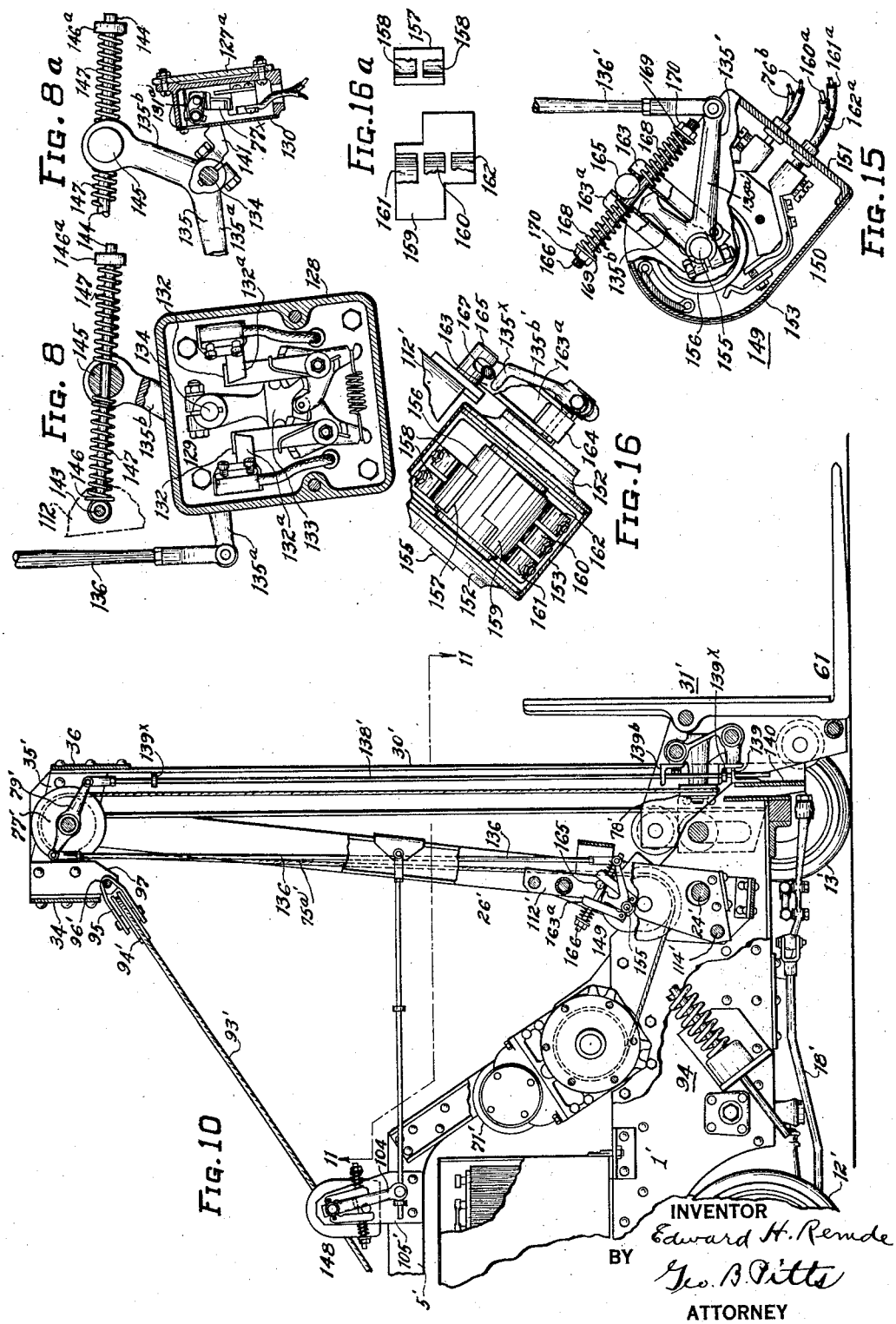

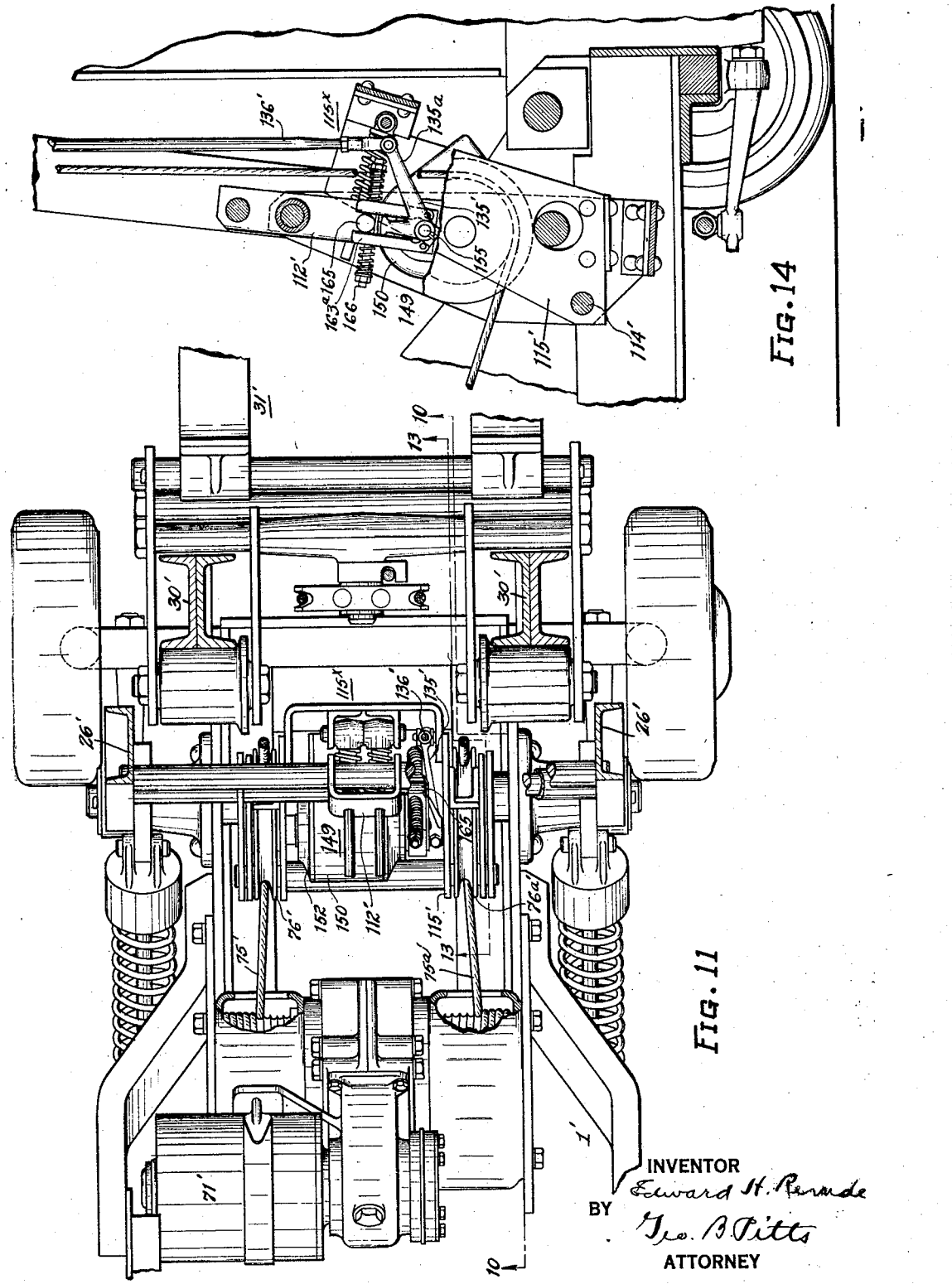

April 18, 1933.  E. H. REMDE  1,904,984
INDUSTRIAL TRUCK
Filed March 18, 1930  7 Sheets-Sheet 7
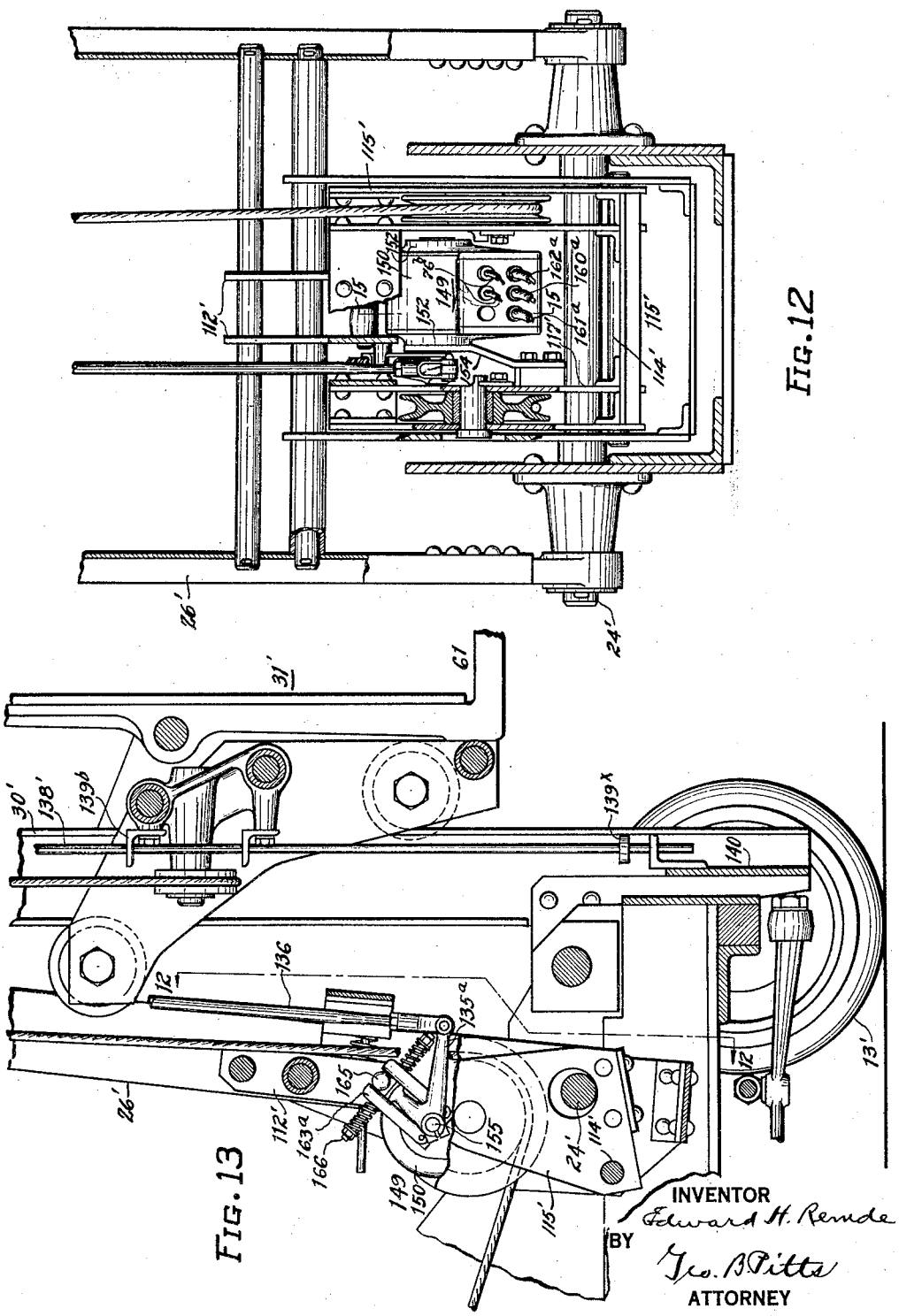

Patented Apr. 18, 1933

1,904,984

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed March 18, 1930. Serial No. 436,855.

This invention relates to an industrial truck of the tiering type.

One object of the invention is to provide, in a truck of this type, an improved slack take-up means for the hoisting mechanism.

Another object of the invention is to provide, in a truck of this type, a combined safety and slack take-up means arranged to stop the motor when the elevating member reaches its limit of movement or slack occurs in the hoisting mechanism.

Another object of the invention is to provide, in a truck of this type, a combined safety and slack take-up means arranged to cut off current to the motor when the elevating member reaches its limit of movement or slack occurs in the hoisting mechanism and to insure braking of the motor to prevent overrun thereof.

Another object of the invention is to provide, in a truck of this type having a tilting guide frame, an improved cable slack take-up means capable of operating irrespective of the position of the guide frame.

Other objects of the invention will be apparent to those skilled in the art to which my invention relates from the following description taken in connection with the accompanying drawings, wherein Fig. 1 is a side elevation of a truck, partly in section on the line 1—1 of Fig. 3 and parts broken away to facilitate the illustration, embodying my invention.

Fig. 2 is a front elevation of the truck, the elevating member being shown in elevated position and parts being broken away.

Fig. 3 is a fragmentary section on the line 3—3 of Fig. 1.

Fig. 4 is a fragmentary section partly on the line 4—4 and partly on the line 4a—4a of Fig. 3.

Fig. 5 is a fragmentary section, substantially on the line 5—5 of Fig. 4; one of the cable sheaves being shown in section.

Fig. 6 is a view partly in side elevation and partly in section substantially on the line 6—6 of Fig. 3 showing the position of the parts when the elevating member is raised and the guide frame tilted inwardly.

Fig. 7 is a view similar to Fig. 6, but showing the position of the parts when the elevating member meets an obstruction in moving downwardly.

Fig. 8 is a detail section on the line 8—8 of Figs. 2 and 5.

Fig. 8a is a fragmentary view of parts shown in Fig. 8.

Fig. 10 is a fragmentary view of a truck partly on the line 10—10 of Fig. 11, embodying my invention, but in which the combined safety and cable slack take-up means are of a slightly different construction.

Fig. 11 is a fragmentary section on the line 11—11 of Fig. 10.

Fig. 12 is a section on the line 12—12 of Fig. 13.

Fig. 13 is a fragmentary section on the line 13—13 of Fig. 11.

Fig. 14 is a fragmentary section similar to Fig. 13, but showing the slack take-up means in operated position.

Fig. 15 is a section on the line 15—15 of Fig. 12.

Fig. 16 is a fragmentary view of parts shown in Fig. 15, parts being in section.

Fig. 16a is a fragmentary view of the contact elements.

Figures 1, 9:
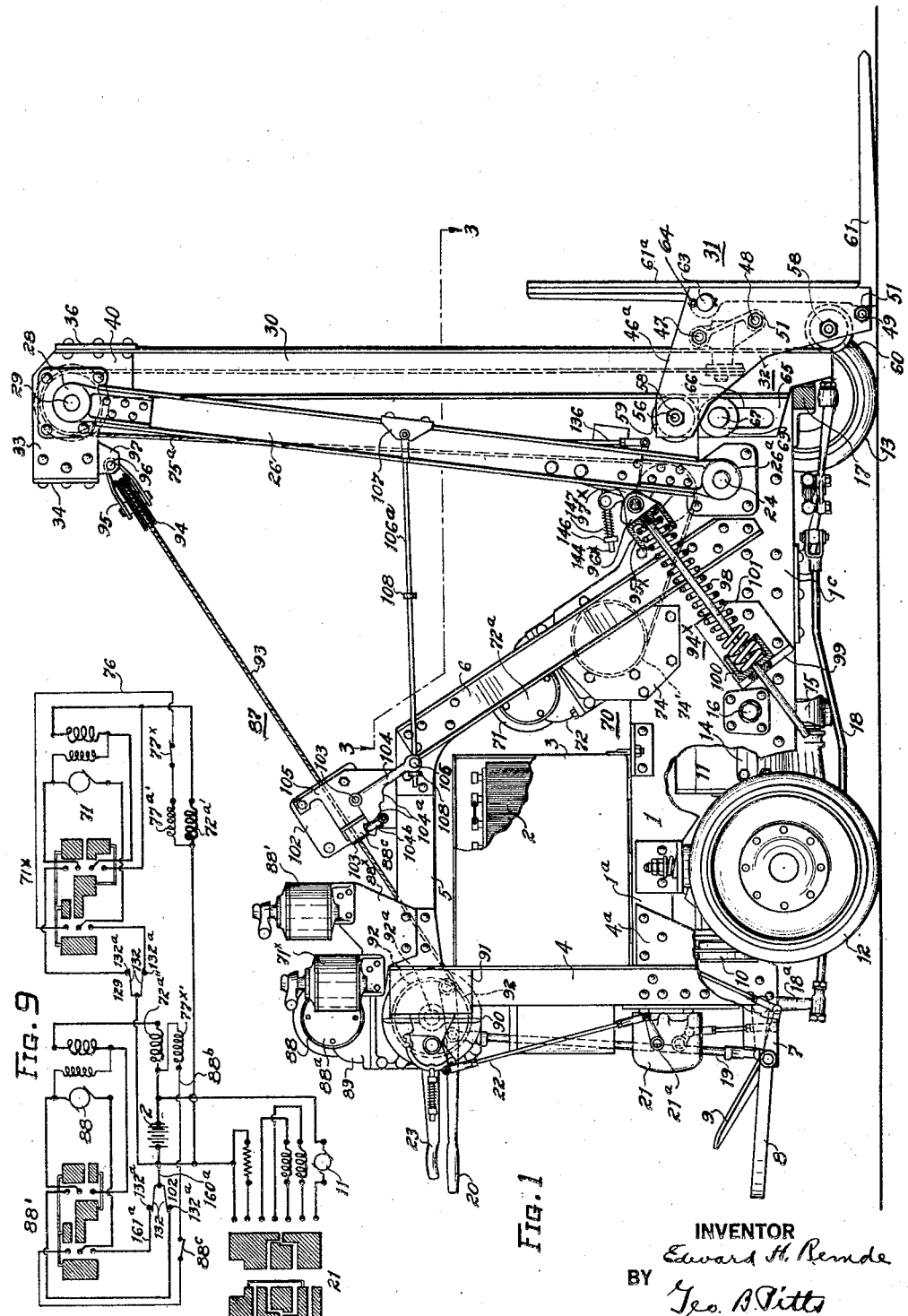
Fig. 9 is a diagram of the electric circuits.

In the drawings, 1 indicates a frame preferably comprising a main section 1a and a relatively low section 1b connected in rigid relation to the main section 1a by side plates 1c. The section 1b comprises a pair of angles 1b' connected by an angle 1d, a front plate 1e and a cross plate 1f. 2 indicates the electric batteries supported on the main section 1a, these being preferably enclosed in a sheet metal casing 3 having one or more removable sections or walls. 4 indicates a pair of uprights (only one being shown in Fig. 1) secured to the frame 1 at its driving end and braced by gussets 4a. The upper end of each upright 4 is preferably connected to the outer portion of the low frame section 1b or the outer portion of the adjacent side plate 1c by a pair of connected bars 5, 6, to insure rigidity between the frame sections and the uprights. The forward ends of the bars 6 are bent inwardly (see Fig. 3) so as to engage the plates 1c. At their lower ends, the uprights 4 carry brackets 7 and these in turn pivotally support an operative's platform 8. 9 indicates a foot pedal associated with the platform 8 and arranged to release a brake mechanism 10 which engages and disengages a wheel or other element driven by a motor 11, the latter being supplied with current from the batteries 2. 12, 13, indicate pairs of wheels for supporting the frame 1, the former being below the main frame section 1a and driven in a well known manner by the motor 11 through suitable power transmitting mechanism. The power transmitting mechanism is enclosed in a suitable housing and the latter terminates in a cradle 14 to which the motor 11 is rigidly connected, as shown in Fig. 1. The cradle 14 is supported by a torque member 15 trunnioned at 16 in the side plates 1c and connected by a universal joint to the cradle 14, the construction and arrangement of the torque member and its connections being substantially similar to like parts shown in Letters Patent No. 1,628,145, dated May 10, 1927. The wheels 12 are mounted on knuckles in a well known manner for steering purposes; likewise the wheels 13 are knuckle mounted on the opposite ends of an axle 17, as shown in dotted lines in Fig. 3, the axle 17 being secured to the angles 1b' between the angle 1d and front plate 1e. Both pairs of wheels are connected by connections 18, for simultaneous steering, and these connections lead to a bell-crank 18a, suitably mounted on one of the brackets 7, and operated through a link 19 by a lever 20. 21 indicates a controller for controlling the supply of current to the motor 11 to drive it in one direction or the other. The controller drum is geared to a shaft 21a which is connected by a linkage 22 to an operating handle 23. The handle 23 is detachably connected to the linkage so that it may be moved to an inoperative position. When connected to the linkage 22, and the controller is in neutral position, the handle 23 projects horizontally.

24 indicates a shaft or pivot pin mounted on the low frame section 1b near its outer end. The side plates 1c are formed with aligned openings through which the shaft extends, its free ends being supported in journals 25 having flanges suitably secured to the outer sides of the side plates 1c.

26 indicates a pair of members swingably mounted at their lower ends on the shaft 24. For this purpose the lower end of each member 26 is provided with a casting terminating in a knuckle 26a through which the shaft 24 extends so that the member 26 may swing about the shaft, the knuckle being disposed between the adjacent journal 25 and a washer 27, secured on the shaft by a cotter pin 27a as shown in Fig. 5. The upper ends of the members 26 are also provided with castings terminating in knuckles 28, which pivotally support the ends of a shaft 29, the latter being held against endwise movement by cotter pins 29a. 30 indicates a guide frame comprising a pair of spaced guides for an elevating member 31 pivotally connected at their upper ends to the shaft 29 and depending therefrom. The shaft 29 serves to support the guides 30 and elevating member 31 when the guides are in vertical position (see Fig. 1) and to swing the upper ends of the guides inwardly when the members 26 are tilted or swung about the shaft 24, for example, to the position shown in Fig. 6. The lower ends of the guides 30 have sliding and pivotal engagement or connection with the low frame section 1b, such connection being indicated as an entirety at 32, so that when the guides are tilted inwardly, a portion of the weight of the guides and elevating member is carried by the low frame section 1b instead of by the members 26. The connection 32 serves to prevent outward movement of the guides 30 should the upper ends of the members 26 swing forwardly unduly. The connection 32 is above the axle 17 and the guides 30 extend below the latter, so that the axle serves as a stop to limit the forward movement of the guides 30 and members 26 at their upper ends in the event of breakage of some part or failure of the limit switch (to be later referred to) to operate. The connection between the guides 30 and shaft 29 may comprise brackets 33 fixed to the guides and extending inwardly at right angles thereto and braced at their inner ends by a cross member 34 and journals 34a carried on the outer sides of these brackets, the shaft 29 extending through openings formed in the brackets and rotatably fitting the journals. The shaft 29 is preferably reinforced intermediate the brackets by bridge members 35 connected to the cross member 34 and a cross member 36 connecting the guides 30 together.

The elevating member 31 consists of the following: 45—45a, 46—46a, indicate pairs of inner and outer plates, these plates being formed with aligned openings through which extend rods 47, 48, 49. Sleeves 50, 50a surround each rod between the plates to space the latter and nuts 51 on the ends of the rods serve to clamp the plates and sleeves in rigid relation, one relative to the other. Each pair of plates 45—45a, 46—46a, is also connected in rigid relation by the following parts: 56 indicates rods extending through aligned openings formed in the plates, each rod being surrounded by a sleeve or bushing 57; the inner ends of the rods are provided with heads which engage the plate 45 or 46, whereas their outer ends are threaded to take nuts 58, which, when tightened against the plate 45a or 46a secure the plates against the ends of the bushing 57.

The bushing 57 on one rod 56 serves as a shaft for a roller 59 which rolls on one surface or way of the adjacent guide 30 and the bushing 57 on the other rod 56 serves as a shaft for a roller 60, which rolls on the opposite surface or way of the adjacent guide 30, the rollers 59—60 between the pairs of plates 45—45a, 46—46a, co-operating to movably support the elevating member on the guides. The load engaging device of the elevating member preferably comprises a plurality of L-shaped members 61 (preferably two members), the upright portions 61a of which are provided with means to removably and adjustably engage a rod 63 having support at its opposite ends in the plates 45a, 46a, as shown in Fig. 3; or these upright portions may be formed with openings 62 through which the rod 63 extends. The rod 63 is held against endwise movement by cotter pins 64. The portions 61a of the L-shaped members 61 are independently slidable on the bar 63 to permit their adjustment one relative to the other according to the size of the load to be engaged and moved.

Of the connection 32, 65 indicates a plate secured to the inner side of each guide 30 and extending inwardly therefrom. The extended portion of the plate is formed with an elongated opening 66 through which extends a shaft 67. The plates 65 are disposed on the outer sides of the side plates 1c. The plates 1c are formed with aligned openings 68 to receive the shaft 67 and support it relatively stationary. The walls of the openings may be reinforced by plates 68a. 69 indicates rollers loosely mounted on the outer or free ends of the shaft 67 and arranged to be engaged by the inner surfaces or ways of the guides 30. As shown in Fig. 1, when the guides are in normal or vertical position, their lower portions engage the rollers 69 so that the latter or the shaft on which they are mounted form an abutment for the guides; but when the supporting members 26 are swung inwardly, they bodily raise and also swing the guides in the same direction; accordingly the guides move around the axis of the shaft 67 and also roll on the rollers 69. It might be noted that the major axes of the openings 66 are parallel to the guides 30 and spaced therefrom a distance equal to the radius of the rollers 69; hence in the movement of the guides to the position shown in Figs. 6 and 7 and back to the position shown in Fig. 1, the shaft 67 will traverse the openings 66. Through the engagement of the walls of the openings 66 with the shaft 67, the guides 30 are interlocked with the low frame section 1b and as a result danger of the lower ends of the guides swinging away from its abutment or relative to the low frame is eliminated. It will also be noted that the plates 65 overlap the outer ends of the side plates 1c and are arranged in close relation thereto, the purpose being to prevent lateral swinging of the guides. My construction permits the guides to be supported and tilted in a relatively simple manner; at the same time it insures rigidity and steadiness of the guides when in either normal or tilted position. As a result the truck may be driven over uneven surfaces without danger of tipping the load.

70 indicates as an entirety the means for raising and lowering the elevating member 31 on the guides 30. Of these means, 71 indicates a motor which is supplied with current from the batteries 2; the current being controlled by a controller 71x. The motor 71 is supported on a housing 72. The housing is supported at its opposite sides by plates 74 secured thereto and to the side plates 1c, as shown in Figs. 1 and 3. Within the housing 72 are mounted suitable drums 74' on which cables 75, 75a, wind or unwind simultaneously according to the direction of rotation of the shaft of the motor 71. The shaft of the motor is automatically held against rotation or freed by a magnetically operated brake, enclosed in the casing 72a, one winding 72a' of the electro-magnet being connected in series with the motor and arranged to release the motor shaft when the circuit to the motor is closed. Another winding 77a' for the magnetic brake is also connected in the circuit parallel to the motor through a shunt 76 having a switch 77x, as shown diagrammatically in Fig. 9, the purpose of which will later appear. The drums 74' are connected to a shaft mounted within the casing 72 and this shaft is driven through suitable reduction gearing by the shaft of the motor 71. If desired, suitable reduction gearing may be interposed between the driven shaft and each drum 74'.

The construction of the driving mechanism for the drums, motor, motor mounting and magnetic brake for its shaft (except for the shunt above referred to) are substantially similar in construction to like parts shown in my application Ser. No. 133,699, filed September 4, 1926, except that the driven shaft carries drums instead of sprockets for chains. From the drums 74', the cables 75, 75a, extend to and reeve around sheaves 76, 76a, which are movably mounted adjacent the lower ends of the members 26, as will later appear, and from these sheaves the cables 75, 75a, extend to and around sheaves 77, 77a, loosely mounted on the shaft 29, and from the latter sheaves the cables extend downwardly and are connected to the equalizer 78 in any desired manner. The sheaves 77, 77a, are spaced from each other on the shaft 29 and in close relation to the plates or bridges 35 by one or more sleeves or collars, one thereof being the hub of a rocker 79, to which reference will later be made. By mounting the sheaves 76—76a, 77—77a, in the manner set forth, the elevating member may be raised or lowered with the guides in normal position or in tilted position.

The equalizer 78 comprises a rocker rotatably mounted on a shaft 78a supported in a boss 78b carried by a bracket 78c, the boss and bracket being preferably formed integrally with the sleeves 50 surrounding the rods 47 and 48. The ends of the cables are carried around grooved portions of the rocker and inserted in openings formed therein and anchored therein by solder or equivalent means 78d (Fig. 3).

87 indicates as an entirety the means for tilting or swinging the members 26 inwardly from their normal or upright position and for controlling their movement from the tilted position back to their normal position. Of these means, 88 indicates a motor which is supplied with current from the batteries 2; the current being controlled by a controller 88', carried by a bracket 88x. The motor 88 is supported on a housing 89. The housing is provided at its opposite ends with projecting ears 90 secured to plates 91 which in turn are secured to the upper ends of the uprights 4. Within the housing 89 are mounted suitable drums 92 on which end portions of a cable 93 wind or unwind simultaneously according to the direction of rotation of the shaft of the motor 88. The shaft of the motor is automatically held against rotation or freed by a magnetically operated brake, enclosed in the casing 88a, one winding 72a' of the electro-magnet being connected in series with the motor and arranged to release the motor shaft when the circuit to the motor is closed. Another winding 77x' for the magnetic brake is also connected in the motor circuit, parallel to the motor, through a shunt 88b having a switch 88c, as shown in the diagram Fig. 9, the purpose of which will later appear. The drums 92 are connected to a shaft 92a mounted within the casing 89 and this shaft is driven through suitable reduction gearing by the shaft of the motor 88. If desired, reduction gearing may be interposed between the driven shaft and each drum 92. The construction of the drums 92, the driving mechanism therefor, motor, motor mounting and brake for the motor shaft may be similar to like parts for operating the cables 75, 75a.

The cable 93 is looped around a sheave 94 carried by a strap or yoke 95, which is pivoted on a cross rod 96, the latter being supported by depending members 97 fixed to the bridge members 35.

In my improved construction, the pivot or shaft 24 for the swingable members 26 is arranged as near the outer end of the low frame section as possible, so that the swingable members may be tilted to an extreme position of inclination, as shown in Fig. 6, which position is substantially 45 degrees to the vertical. When in this position, the load carrying member 31 forms a cradle for the load and thus eliminates danger of the load or portions thereof being jounced off. For this reason, the truck may be advantageously used for handling and transporting packs of sheet steel or other sheet material, whether such packs are crated or bound together or in stacked relation without binding means around them.

By inclining the members 26 to the position shown, all portions of the elevating member 31, when moved upward as shown in Fig. 6, will be positioned inwardly of the outer extremities of the wheels 13; that is, the free ends of the members 61 will not project beyond the wheels 13, so that the truck may be stored, turned or manipulated in a restricted area. However, it will be noted that when the members 26 are tilted to the position shown and the elevating member 31 is moved upwardly the center of gravity of these parts, that is, the members 26, guides 30 and elevating member 31, moves or shifts to a point inwardly of the shaft 24. For this reason I provide means, indicated as an entirety at 94x, for (a) yieldingly arresting the inward movement of the members 26, upon the stopping of the motor 88 and (b) for swinging or returning the members outwardly, upon the paying out of the cable 93, far enough to shift the center of gravity outwardly of the shaft 24. The arresting and return means 94x comprise a set of devices between each swingable member 26 and the frame 1. As these sets of devices are similar I will describe one set as follows: 95x indicates a socket or cup member having ears 96x pivotally connected to a lug 97x carried by the adjacent member 26. The socket 95x forms a seat for one end of a coiled spring 98, the opposite end of the spring engaging a bracket 99 mounted on the adjacent side plate 1c or seated within a cup member 100 carried thereby. 101 indicates a rod extending through the coils of the spring 98 to guide the coils as they are compressed or expanded and to prevent undue buckling thereof. The upper end of the rod 101 is secured in any desired manner to the bottom of the socket 95x and centrally thereof; the opposite end of the rod extends through registering openings formed in the cup member 100 and bracket 99, centrally of the cup member, these openings being large enough to permit the rod to rock or swivel as well as slide therein due to the arc traversed by the socket 95x as the member 26 swings inwardly and outwardly.

When the cable 93 is wound on the drums 92, and the guide frame is tilted to the position shown in Figs. 6 and 7, the springs 98 are compressed, so that upon the paying out of the cable the springs will swing the guide frame forwardly.

The construction so far described, except as to certain details noted, is similar to the construction described and claimed in my copending application Serial No. 336,963, filed Feb. 2, 1929 (see Letters Patent No. 1,789,023, dated January 13, 1931) and no claim is made herein to such construction.

The limit means for shutting off or stopping the motor 88 when the swingable members 26 reach their limit of movement in either direction comprises a main switch mechanism 102 and the auxiliary switch 88c (already referred to), both of which are operated by one of the swingable members 26. The main switch mechanism has two pairs of contacts and a device which operates one contact of either pair to break the circuit accordingly as the members 26 move in one or the other direction. The operating device is connected to a rock shaft 103 to which is fixed an arm 104. The auxiliary switch 88c comprises a pair of contacts, the movable one of which is normally biased into closed position and operated to break the shunt circuit 88b by cams 104a provided on the arm 104. As shown in Fig. 1, the members 26 being at the limit of their outward movement, one cam 104a has engaged the switch arm 104b and opened the switch. Upon movement of the members 26 inwardly, the roller on the switch arm 104b will ride off the adjacent cam into the space or notch between the cams, thus permitting the auxiliary switch to close; and as the members 26 reach their other extreme position, the other cam 104a will engage and operate the switch arm 104b and effect opening of the switch and breaking of the circuit across the winding 77x'. As the auxiliary switch is opened substantially simultaneously with the operation of one pair of contacts of the main switch, it insures complete cut out of all magnetic flux so that the braking elements can operate effectively to stop the motor and prevent overrun thereof. The casings for the main switch mechanism 102 and the auxiliary switch are supported by a bracket 105 fixed to the adjacent bar 5. The main switch mechanism 102 and the auxiliary switch 88c are similar in construction to those used for controlling the motor 71 and braking means therefor (see Figs. 8 and 8a) which are hereinafter more clearly described.

The outer end of the arm 104 is bifurcated and the bifurcations are hollowed out to form bearings for a block 106, capable of rocking therein. The block is formed with a transverse opening to slidably receive a rod 106a pivotally connected at its outer end to a bracket 107 fixed in any desired manner to the adjacent swingable member 26. At opposite sides of the arm 104, the rod 106a carries adjustable tappets 108, the outer one of which engages and moves the arm 104 in one direction to open the motor circuit and shunt when the members 26 approach their limit of movement inwardly, as shown in Fig. 6, and the other of which engages and moves the arm in the opposite direction to open the motor circuit and shunt when the members 26 approach their limit of movement in the outward direction, as shown in Fig. 1.

The limit means for stopping the motor 88 are arranged to break the circuit when the members 26 approach their limit of movement and the arresting springs are of such strength that they arrest and support the members 26 at their inner position whether the elevating member is loaded, and with or without a load, it is raised to its highest position. To tilt the members 26, the cable 93 is wound on the drums 92, thereby pulling the upper ends of the members 26 inwardly in opposition to the springs 98 until the motor is stopped. When the motor is stopped the drums will be held against rotation; hence the cable 93 will hold the members in their inclined position and prevent the springs 98 from moving the members outwardly; but upon paying out of the cable 93 the springs 98 will move the members 26 outwardly and keep the cable 93 taut between the members 26 and the drums during such movement. It will thus be seen that while the cable 93 moves the members 26 inwardly and the springs move them outwardly, the movement of the members in both directions is under the control of the drums or the motor 88 for driving them.

109, 109, indicate a pair of spaced side plates formed with pairs of aligned openings, the shaft or fulcrum 24 extending through one pair of openings and a rod 110 extends through the other pair of openings, the rod 110 being supported at its opposite ends in openings 110a formed in the members 26, whereby the plates 109 are supported by and swing with the members 26. A second rod 111 is also supported in openings formed in the swingable members 26 and this rod and the rod 110 extend through aligned openings formed in a U-member 112 to support the latter on these rods. The purpose of the U-member will later appear. Suitable sleeves 113 are interposed between each side of the U-member 112 and the adjacent plate 109 and between the latter and the adjacent swingable member 26 to maintain them in rigid relation to each other and the members 26.

114 indicates a shaft supported at its ends in the side plates 109 near their lower, inner ends and forming a pivot for a frame indicated as an entirety at 115. The frame 115 comprises a base plate 116 and pairs of upstanding spaced plates 117—117a, 118—118a, connected at their upper ends by angles 116a. The pairs of plates support the ends of shafts 119, 119a, respectively, on which the sheaves 76, 76a, are respectively mounted. The plates 117—117a, 118—118a, are formed with aligned openings 120 through which the shaft 24 extends, but these openings 120 are somewhat larger than the shaft to permit the frame 115 to swing about its pivot 114 to a limited extent, the walls of the openings 120 engaging with the shaft to limit such movement in either direction. Figs. 4 and 6 show the frame 115 in one extreme position, the pull on the cables serving to hold the frame against the shaft 24, whereas Fig. 7 shows the frame 115 moved to its other extreme position incident to taking up slack in the cables 75, 75a. As the frame 115 is pivotally mounted on the swingable members 26, as already described, it is movable to take up slack in the cables at any time irrespective of the position of these members. The frame 115 also includes a supplemental U-member 121, the sides of which are secured to the plates 117, 118. The inner face of the U-member 121 supports a pair of angles 122, in which is mounted a shaft 123. The shaft rotatably supports a plurality of knuckles 124 having secured to them rods 125 which extend inwardly through suitable openings formed in the base portion of the U-member 112, these openings being large enough to permit the rods 125 to freely slide and swivel therein. Interposed between a suitable collar adjacent each knuckle 124 and the U-member 112 is an expansion spring 126 coiled around the adjacent rod, whereby these springs normally tend to swing the frame 115 about its pivot 114 relative to the swingable members 26, in opposition to the pull of the cables 75, 75a, so that upon the occurrence of slack therein due for example to the elevating member engaging an obstruction A (see Fig. 7) in the downward movement thereof, the springs 126 will move the frame 115 as just described. As the sheaves 76, 76a, are supported by this frame, their movement about the shaft 114 with the frame 115 will take up such slack.

I provide a limit switch mechanism for stopping the motor 71 when the elevating member 31 reaches its limit of movement in either direction. This mechanism is associated with the slack take-up means in such manner that it will stop the motor 71 while the frame 115 is moving from the position shown in Figs. 1 and 4, to the position shown in Fig. 7, so that the swing of the frame 115 may be advantageously limited and danger of undue slack occurring in the cables before the motor is stopped is avoided.

127 indicates a bracket secured to one of the angles 122 and extending rearwardly therefrom. On its inner face the bracket supports a casing 128 enclosing a main switch mechanism 129 (see Fig. 8) and a laterally bent portion 127a of the bracket supports a casing 130 enclosing an auxiliary switch 77x (see Figs. 8a and 9). The main switch mechanism comprises pairs of contacts 132—132a, through which the motor circuit passes as the motor 71 is operated in one direction or the other, and an operating device 133 arranged to move the movable contact 132 of either pair to break the motor circuit accordingly as the elevating member 31 moves to its uppermost or lowermost position. The operating device 133 is fixed to a rock shaft 134 to which is connected exterior of the casing 128 a bell crank 135, one arm 135a of which is pivotally connected to the lower end of a rod 136. The upper end of this rod is pivotally connected to one end of the rocker 79 (already referred to) rotatably mounted on the shaft 29. From the opposite end of the rocker depends a rod 138 guided at its lower end in an opening formed in a bracket 139 which is mounted on a cross plate 140 supported between the guides 30. The rod 138 carries collars 139a, 139a', adjustably fixed thereto, arranged to be engaged by strikers 140x, 140ax, respectively, when the elevating member moves upwardly or downwardly. The strikers are fixed to the bracket 78c, as shown in Figs. 6 and 7. When the striker 140x engages the collar 139a, in the upward movement of the elevating member 31, it operates through the rod 138, rocker 79, rod 136, lever 135 and operating member 133 to open one of the pairs of contacts 132—132a, the effect of which is to break the motor circuit; likewise, when the striker 140ax engages the collar 139a', in the downward movement of the elevating member 31, it operates through these parts to open the other pair of contacts and thus break the motor circuit. The lever or bell-crank 135 is provided with an arm 141 the free end of which normally engages a roller on a lever 142 connected to the movable contact of the switch 77x (which is normally biased to open position by a spring 131a) and holds the switch closed. Accordingly, when the lever 135 is operated as just described, the arm 141 simultaneously disengages the roller on the lever 142 and allows the switch to open, thus breaking the shunt circuit through the winding 77a' for the magnetic brake.

The construction of the main switch mechanisms 102 and 129 disclosed herein are preferably constructed similarly to the mechanism shown and claimed in Letters Patent No. 1,726,717, dated September 3, 1929.

The connection between the other arm 135b of the bell crank 135 and one of the swingable members 26 comprises the following: 143 indicates a pivot or stud-shaft provided on one side wall of the U-member 112. 144 indicates a rod having at its outer end a knuckle rotatably mounted on the pivot 143. The rod 144 slidably extends through a block 145 which is mounted to rock in bifurcations provided on the free end of the arm 135b. The rod 144 is provided at its outer and inner ends with collars 146, 146a, respectively, and between each collar and the arm 135b or the block 145 is a compression spring 147, which forms the connection between the arm and the rod. Accordingly, when the sheave carrying frame 115 swings relative to the swingable members 26, due to slack occurring in the cables 75, 75a, the springs 147 will hold the arm 135 substantially stationary while the casing 128 for the switch mechanism 129 moves with the frame 115, the effect of which is to rock the shaft 134 and operate the arm 133 and thus open one pair of switch contacts 132—132a. Such operation of the arm 135 will also operate the auxiliary switch as already described. By pivoting the rod 144 as described, it accommodates itself to the positions of the outer end of the arm 135b as the casing 128 swings with the frame 115. By providing springs between the opposite sides of the arm 135b and the rod 144, the arm 135b is permitted to move relative to the rod in either direction, when the lever or bell-crank is operated by the engagement of the elevating member with either one of the collars 139a, 139a'.

From the foregoing description, it will be noted that a single cut-out mechanism comprising a main switch mechanism and an auxiliary switch serves to stop the motor 71 in the event the elevating member 31 reaches its limit of movement in either direction or slack occurs in the hoisting cables. When the elevating member 31 effects operation of the switch mechanism, that is, opening of one pair of contacts 132—132a, reversing of the motor 71 and movement of the elevating member 31 in the opposite direction will permit the rod 138 and parts connected thereto to return to normal position under the influence of a spring 133b (Fig. 5) surrounding the rock shaft 134 to which the operating device 133 and bell crank 135 are connected, such spring being arranged to be put under tension when the device 133 moves in either direction. Also, after slack occurs in the cables 75, 75a, and the switches have been operated as described, reversal of the motor 71 to wind up the cables will swing the frame 115 to its normal position (Figs. 1 and 4) and allow the switches to assume their normal position.

Referring to the diagram in Fig. 9, it will be noted that the magnetic brake for each of the motors 71 and 88 has a compound winding, and the circuit for one winding is shunted across the motor, as shown at 76, 88b, respectively, so that sufficient current will flow through the magnet windings to insure the release of the brake when loads are being lowered. The compound windings for the magnetic brake associated with the motor 71 are shown at 72a'', 77a'', the latter being connected in the shunt circuit 76; and the compound windings for the magnetic brake associated with the motor 88 are shown at 72a', 77a', the latter being connected in the shunt circuit 88b. To prevent the generated current incident to the rotation of each motor from maintaining the windings of the adjacent brake energized following the breaking of the circuit through either pair of switch contacts of the adjacent main switch mechanism, I provide in each shunt circuit a switch (herein referred to as an auxiliary switch) which is operated by the device that operates the adjacent main switch mechanism and substantially simultaneously therewith, to break the shunt circuit. For example, when the elevating member 31 is raised or lowered to either extreme position, one pair of switch contacts 132—132a of the switch mechanism 129 is operated to cut out the motor 71 and substantially simultaneously the auxiliary switch 77x is opened to break the shunt circuit 76 through the winding 77a', thereby completely eliminating danger of magnetic flux in either or both windings 72a', 77a', of the adjacent magnetic brake; likewise, when the guides 30 are moved to either extreme position, one pair of switch contacts 132—132a of the switch mechanism 102 is operated to cut out the motor 88 and substantially simultaneously the auxiliary switch 88c is opened to break the shunt circuit 88b through the winding 77x', thereby completely eliminating danger of magnetic flux in either of both windings 72a', 77x' of the adjacent magnetic brake.

In Figs. 10 to 14, inclusive, I have shown a truck similar to that shown in Figs. 1 to 7, inclusive, but having embodied in it different forms of cut-out mechanisms for the motors which respectively tilt the guide frame inwardly and raise and lower the elevating member.

Referring to these views, 1' indicates the truck frame mounted on traction wheels 12' and load supporting wheels 13' connected together for simultaneous steering by suitable connections 18'. 24' indicates a shaft supported similarly to the shaft 24. 26' indicates the members swingable on the shaft 24' inwardly and outwardly and supporting at their upper ends guides 30', whereby the guides may be tilted inwardly for reasons already set forth. 31' indicates the elevating member, which is moved upwardly and downwardly on the guides 30'. 93' indicates a cable which loops around a guide sheave 94' pivotally connected at 96' to the upper ends of the guides as already described, the ends of the cable being connected to a pair of drums which are rotated together to wind or unwind these ends by a motor the shaft of which is braked by a magnetic brake connected in series with the motor. The motor which drives the drums to effect swinging of the members 26' and tilting of the guides 30' and the brake for the motor are not shown, but are similar to corresponding parts shown in Figs. 1, 2, 6 and 7, as already described.

75′, 75a′ indicate cables connected to the elevating motor 71′ and reeved over sheaves 76′, 76a′, mounted on a swingable frame 115′, and sheaves 77′ supported at the upper ends of the guides 30′ and connected to an equalizer 78′ on the elevating member 31′.

The swingable frame 115′ swings on the shaft 114′ when slack occurs in the cables 75′, 75a′, the sheaves 76′, 76a′, being mounted on this frame as already described in connection with Figs. 1, 2, 3, 4, 5, 6 and 7. The slack take-up mechanism indicated as an entirety at 115x is similar in construction to that shown in Figs. 1 to 7 already described, for which reason the description thereof is not repeated.

148 indicates as an entirety the cut-out mechanism for the circuit for the tilting motor and its shunt circuit, comprising a main switch mechanism and an auxiliary switch. This cut-out mechanism 148 is mounted on a bracket 105′ secured to the adjacent bar 5′ and is provided with a lever 104′ connected to and operated by members 26′ similarly to that described in connection with Figs. 1, 2, 6 and 7. The cut-out mechanism 148 is similar in construction to a cut-out mechanism indicated as an entirety at 149, which breaks the circuit to the elevating motor 71′, so that a description of this latter mechanism will suffice for both.

Of the cut-out mechanism 149, 150 indicates a casing comprising a base 151, having side walls 152 and a cover 153. One side wall 152 is secured to a bracket 154 carried by the adjacent side plate 117′ of the frame 115′. 155 indicates a shaft supported at its ends in the side walls 152 and carrying a drum 156. The drum is provided with a contact plate 157 which is engaged and disengaged by contact fingers 158 suitably supported by one side wall 152 and connected to leads 76b, 76b, this plate and these fingers constituting the auxiliary switch 77x shown in the diagram (Fig. 9). The drum 156 is also provided with a contact plate 159 (shaped as shown in Fig. 16a), which is engaged by a finger 160 (connected to lead 160a) and engaged and disengaged by fingers 161, 162, (connected to leads 161a, 162a, respectively) the plate 159 and fingers 160, 161, 162, constituting the main switch mechanism. Figs. 15 and 16 show the normal position of the drum, that is, with the fingers 158 in engagement with the plate 157 and the fingers 161, 162, in engagement with the plate 159. By reference to Fig. 16a, it will be noted that if the drum is rotated in one direction (clockwise as viewed in Fig. 15) due to the elevating member reaching its upward limit of movement, the plate 157 will move beyond the fingers 158 and thus break the shunt circuit 76 and the plate 159 will move beyond the finger 162 and thus break the motor circuit and de-energize the winding 72a′ of the brake; and if the drum is rotated counter-clockwise due to the (a) elevating member reaching its downward limit of movement or (b) operation of the slack take-up mechanism, the plate 157 will move beyond the fingers 158 in the opposite direction, thereby breaking the shunt circuit and the plate 159 will move beyond the finger 161, thereby breaking the motor circuit and de-energizing the winding 72a′ of the brake.

135′ indicates a bell crank fixed to one end of the drum shaft 155. The arm 135a′ of the bell crank is pivotally connected to a rod 136′, and the upper end of the latter is connected to the lever 79′, which in turn is pivotally connected to the rod 138′ carrying the tappets 139x, 139x, adapted to be engaged by strikers 139b, respectively, fixed to the elevating member 31′. The other arm 135b′ of the bell crank is provided with a lateral finger 135x (see Fig. 16) disposed between a pair of arms 163, 163a, pivotally mounted at their inner ends upon diametrically opposite sides of a collar 164 loosely mounted on the shaft 155 between the adjacent side wall 152 and the bell crank 135′. When the drum 156 is in normal position (as shown in Figs. 11, 15, and 16), the arms 163, 163a, will be disposed substantially parallel to each other upon opposite sides of the finger 135x and a pin 165 fixed to the U-member 112′ which is connected to and moves with the swingable members 26′. The outer portions of the arms 163, 163a, are formed with openings (elongated longitudinally of the arms) in which is mounted a rod 166 extending to either side of the arms, a recess 167 being formed in the pin 165 to accommodate the rod. 168 indicates a spring coiled around the rod 166 between each arm 163, 163a, and a collar 169 adjustably fixed to the adjacent outer portion of the rod by a nut 170 and normally tending to maintain the adjacent arm in the position shown in Fig. 15. From the foregoing description it will be seen that through the coaction of the springs acting simultaneously to hold the arms 163, 163a, in engagement with the pin 165 and finger 135x, these arms will serve as a connection between the U-member 112′ and the bell-crank arm 135b′, so that in the event the sheave carrying frame 115′ (which carries the casing 150) swings about the shaft 114′, due to slack occurring in the cables 75′, 75a′, the outer end of the arm 135b′ will be held relatively stationary and thus effect a rotation of the drum shaft 155, whereby the motor circuit and shunt circuit will be broken as already described. When the elevating member 31′ is moved to its extreme lower position (see Fig. 10), the bell-crank 135′ and drum 156 are moved counter-clockwise, but as the arms 163, 163a, are swingable independently away from each other, it will be seen that the arm 135b′ of the bell-crank will swing the arm 163a laterally, compressing the adjacent spring 168, whereas the pin 165 will hold the other arm 163 stationary (see Fig. 10); likewise, when the elevating member 31' is moved to its extreme upper position, the bell-crank arm 135b' (which is swung clockwise) will swing the arm 163 laterally and the pin 165 will hold the other arm 163a stationary.

It will therefore be seen that through this compensation connection between the bell-crank 135' and the U-member 112', the cut-out mechanism is operable independently of and without affecting the take-up mechanism. It will also be noted that the cut-out mechanism is operated by the elevating member 31' and the slack take-up mechanism 115x in any position to which the guides may be moved.

To those skilled in the art to which my invention relates, many modifications and embodiments of the invention and applications thereof will suggest themselves without departing from the spirit and scope thereof. The description and the disclosure herein are purely illustrative and are not intended to be in any sense limiting.

What I claim is:

1. In apparatus of the class described, the combination of a wheel mounted frame, a guide frame thereon, an elevating member mounted for movement along said guide frame, a flexible member connected to said elevating member for moving it along said guide frame, a sheave at the upper end of said guide frame and around which said flexible member is reeved, a support movably mounted on one of said frames, near the lower end of said guide frame, a sheave carried by said support and around which said flexible member is reeved, means for winding up and paying out said flexible member, the pull on said flexible member operating through the sheave on said support to move the latter in one direction, and a spring normally acting on said support to move it in the opposite direction.

2. In apparatus of the class described, the combination of a wheel mounted frame, a guide frame thereon, an elevating member mounted for movement along said guide frame, flexible members connected to said elevating member for moving it along said guide frame, sheaves at the upper end of said guide frame and around which said flexible members reeve, a support movably mounted on one of said frames and comprising spaced side members, sheaves carried by the side members of said support and around which said flexible members reeve, means for simultaneously winding up and simultaneously paying out said flexible members, the pull on said flexible members operating through the sheaves on said support to move the latter in one direction, and a spring normally acting on said support to move it in the opposite direction.

3. In apparatus of the class described, the combination of a wheel mounted frame, a guide frame thereon, an elevating member mounted for movement along said guide frame, flexible members connected to said elevating member for moving it along said guide frame, sheaves at the upper end of said guide frame and around which said flexible members reeve, a support movably mounted on one of said frames near the lower end of said guide frame and comprising spaced side members, sheaves carried by the side members of said support and around which said flexible members reeve, means for simultaneously winding up and simultaneously paying out said flexible members, the pull on said flexible members operating through the sheaves on said support to move the latter in one direction, and a spring normally acting on said support to move it in the opposite direction.

4. In apparatus of the class described, the combination of a wheel mounted frame, a member pivotally mounted at its lower end on said frame and swingable inwardly and outwardly, a guide frame pivotally connected to the upper end of said swingable member and having movable engagement at its lower portion with said first mentioned frame, means for swinging said swingable member, an elevating member mounted for movement along said guide frame, a flexible member connected to said elevating member for moving it along said guide frame, a sheave at the upper end of said guide frame and around which said flexible member is reeved, a support mounted on one of said frames to move relative to said swingable member, a sheave carried by said support and around which said flexible member is reeved, means for winding up and paying out said flexible member, the pull on said flexible member operating through the sheave on said support to move the latter in one direction, and a spring normally acting on said support to move it in the opposite direction.

5. In apparatus of the class described, the combination of a wheel mounted frame, a member pivotally mounted at its lower end on said frame and swingable inwardly and outwardly, a guide pivotally connected to the upper end of said swingable member and having movable engagement at its lower portion with said frame, means for swinging said swingable member, an elevating member mounted for movement along said guide, a flexible member connected to said elevating member for moving it along said guide, a sheave at the upper end of said guide and around which said flexible member is reeved, a support mounted on said swingable member to move relative thereto, a sheave carried by said support and around which said flexible member is reeved, means for winding up and paying out said flexible member, the pull on said flexible member operating through the sheave on said support to move the latter in one direction, and a spring normally acting on said support to move it in the opposite direction.

6. In apparatus of the class described, the combination of a wheel mounted frame, a pair of spaced members pivotally mounted at their lower ends on said frame and swingable inwardly and outwardly, a guide pivotally connected to the upper ends of said swingable members and having movable engagement at its lower end with said frame, means for swinging said swingable members, an elevating member mounted for movement along said guide, a flexible member connected to said elevating member for moving it along said guide, a sheave at the upper end of said guide and around which said flexible member is reeved, a support between and mounted on said swingable members below their upper ends to move relative thereto, a sheave carried by said support and around which said flexible member is reeved, means for winding up and paying out said flexible member, the pull on said flexible member operating through the sheave on said support to move the latter in one direction, and a spring normally acting on said support to move it in the opposite direction.

7. In apparatus of the class described, the combination of a wheel mounted frame, a member pivotally mounted at its lower end on said frame and swingable inwardly and outwardly, means for swinging said swingable member, a guide pivotally connected to the upper portion of said member and movably engaging said frame at its lower portion, an elevating member mounted for movement along said guide, a flexible member connected to said elevating member for moving it along said guide, a sheave at the upper end of said guide and around which said flexible member reeves, means for winding up and paying out said flexible member, and means carried by said swingable member for taking up slack in said flexible member.

8. In apparatus of the class described, the combination of a wheel mounted frame, a member pivotally mounted at its lower end of said frame and swingable inwardly and outwardly, means for swinging said swingable member, a guide pivotally connected to the upper portion of said member and movably engaging said frame at its lower portion, an elevating member mounted for movement along said guide, a flexible member connected to said elevating member for moving it along said guide, a sheave at the upper end of said guide and around which said flexible member reeves, means for winding up and paying out said flexible member, and means carried by said swingable member for taking up slack in said flexible member, said means including a sheave engaging said flexible member and movably mounted on said swingable member.

9. In apparatus of the class described, the combination of a wheel mounted frame, a pair of inner and outer members pivotally connected at their upper ends, the inner member being pivotally mounted at its lower end on said frame and swingable inwardly and outwardly and the outer member movably engaging said frame at its lower portion and serving as a guide, means for swinging said members relative to said frame, an elevating member mounted for movement along said guide member, a flexible member connected to said elevating member for moving it along said guide member, a sheave at the upper ends of said inner and outer members and around which said flexible member reeves, means for winding up and paying out said flexible member, and means carried by one of said first mentioned members for taking up slack in said flexible member.

10. In apparatus of the class described, the combination of a wheel mounted frame, a member pivotally mounted at its lower end on said frame and swingable inwardly and outwardly, a guide pivotally connected to the upper portion of said member and movably engaging said frame at its lower portion, means for swinging said swingable member, an elevating member mounted for movement along said guide, a flexible member connected to said elevating member for moving it along said guide, a sheave at the upper end of said guide and around which said flexible member reeves, a support pivotally mounted on said swingable member and carrying a sheave around which said flexible member is reeved, said support being formed with an enlarged opening through which the pivot for said flexible member extends, means for winding up and paying out said flexible member, the pull on said flexible member operating through the sheave carried by said support to swing the latter in one direction, and a spring normally acting on said support to swing it in the opposite direction for taking up slack in said flexible member.

11. In apparatus of the class described, the combination of a wheel mounted frame, a member pivotally mounted at its lower end on said frame and swingable inwardly and outwardly, means for swinging said member, a guide pivotally connected to the upper end of said swingable member and having movable engagement with said frame, an elevating member mounted for movement along said guide, a flexible member connected to said elevating member for moving it along said guide, a sheave at the upper end of said guide and around which said flexible member is reeved, a support mounted on said swingable member to move relative thereto, a sheave carried by said support and around which said flexible member is reeved, means for winding up and paying out said flexible member, the pull on said flexible member operating through the sheave on said support to move the latter in one direction, a spring normally acting on said support to move it in the opposite direction, and a mechanism on said swingable member having means arranged to be engaged and operated by said elevating member for stopping said winding up and paying out means.

12. In apparatus of the class described, the combination of a wheel mounted frame, a member pivotally mounted at its lower end on said frame and swingable inwardly and outwardly, means for swinging said member, a guide pivotally connected to the upper end of said swingable member and having movable engagement with said frame, an elevating member mounted for movement along said guide, a flexible member connected to said elevating member for moving it along said guide, a sheave at the upper end of said guide and around which said flexible member is reeved, a support mounted on said swingable member to move relative thereto, a sheave carried by said support and around which said flexible member is reeved, means for winding up and paying out said flexible member, the pull on said flexible member operating through the sheave on said support to move the latter in one direction, a spring normally acting on said support to move it in the opposite direction, a mechanism on said support having means arranged to be engaged and operated by said elevating member for stopping said winding up and paying out means, when said elevating member approaches its limit of movement in one direction, and a connection between said support and the last mentioned means for stopping said means when said support is actuated by said spring.

13. In apparatus of the class described, the combination of a wheel mounted frame, a member pivotally mounted at its lower end on said frame and swingable inwardly and outwardly, means for swinging said member, a guide pivotally connected to the upper end of said swingable member and having movable engagement with said frame, an elevating member mounted for movement along said guide, a flexible member connected to said elevating member for moving it along said guide, a sheave at the upper end of said guide and around which said flexible member is reeved, a support mounted on said swingable member to move relative thereto, a sheave carried by said support and around which said flexible member is reeved, means for winding up and paying out said flexible member, the pull on said flexible member operating through the sheave on said support to move the latter in one direction, a spring normally acting on said support to move it in the opposite direction, a mechanism on said support having means arranged to be engaged and operated by said elevating member for stopping said winding up and paying out means, when said elevating member approaches its limit of movement in one direction, and a connection between said support and the last mentioned means for stopping said means when said support is actuated by said spring, said connection including compensating means to permit operation of said mechanism independently of movement of said support.

14. In apparatus of the class described, the combination of a wheel mounted frame, a member pivotally mounted at its lower end on said frame and swingable inwardly and outwardly, means for swinging said member, a guide pivotally connected to the upper end of said swingable member and having movable engagement with said frame, an elevating member mounted for movement along said guide, a flexible member connected to said elevating member for moving it along said guide, a sheave at the upper end of said guide and around which said flexible member is reeved, a pair of supporting devices mounted on said swingable member, one of said devices being mounted to move relative to the other, a sheave carried by said movable device and around which said flexible member is reeved, means for winding up and paying out said flexible member, the pull on said flexible member operating through the sheave on said movable device to move the latter in one direction, and a spring between said devices normally acting thereon to move the movable device in the opposite direction.

15. In apparatus of the class described, the combination of a wheel mounted frame, a member pivotally mounted at its lower end on said frame and swingable inwardly and outwardly, means for swinging said member, a guide pivotally connected to the upper end of said swingable member and having movable engagement with said frame, an elevating member mounted for movement along said guide, a flexible member connected to said elevating member for moving it along said guide, a sheave at the upper end of said guide and around which said flexible member is reeved, a pair of supporting devices mounted on said swingable member, one of said devices being mounted to move relative to the other, a sheave carried by said movable device and around which said flexible member is reeved, means for winding up and paying out said flexible member, the pull on said flexible member operating through the sheave on said movable device to move the latter in one direction, a spring between said devices normally acting thereon to move the movable device in the opposite direction, and a mechanism on said devices having elements arranged to be engaged and operated by said elevating member for stopping said winding up and paying out means.

16. In apparatus of the class described, the combination of a wheel mounted frame, a member pivotally mounted at its lower end on said frame, a guide pivotally connected to the upper portion of said swingable member, an elevating member movable along said guide, means for swinging said swingable member, a flexible member connected to said elevating member for moving it, a sheave around which said flexible member is reeved, mounted at the upper end of said guide, a support movably mounted on said swingable member and carrying a sheave around which said flexible member is reeved, means for winding up and paying out said flexible member, the pull on said flexible member operating through the sheave on said support to move the latter in one direction, a spring normally acting on said support to move it in the opposite direction, and means between and connected to said swingable member and said support and operated by the movement of the latter relative to said member for stopping said winding up and paying out means.

17. In apparatus of the class described, the combination of a wheel mounted frame, a member pivotally mounted at its lower end on said frame and swingable inwardly and outwardly, means for swinging said member, a guide pivotally connected to the upper end of said swingable member and having movable engagement with said frame, an elevating member mounted for movement along said guide, a flexible member connected to said elevating member for moving it along said guide, a sheave at the upper end of said guide and around which said flexible member is reeved, a support mounted on said swingable member to move relative thereto, a sheave carried by said support and around which said flexible member is reeved, means for winding up and paying out said flexible member, the pull on said flexible member operating through the sheave on said support to move the latter in one direction, a spring normally acting on said support to move it in the opposite direction, a mechanism on said support having means arranged to be engaged and operated by said elevating member for stopping said winding up and paying out means, when said elevating member approaches its limit of movement in one direction, and a connection between said support and the last mentioned means for stopping said means when said support is actuated by said spring, said connection including a lever arm, a pair of arms on the opposite sides of said lever arm swingable relative to each other, a rod, springs carried by the rod normally tending to swing said arms toward said lever arm and a device carried by said swingable member and disposed between said swingable arms.

18. In apparatus of the class described, the combination of a wheel mounted frame, a load handling member movably mounted on said frame, and means for moving said member, said means including an electric motor, a source of current supply, a circuit between said motor and said source of current supply, a shunt in said circuit arranged parallel to said motor, a magnetically operated brake means for said motor, having windings, one of which is connected in series with said motor, and the other of which is connected in said shunt circuit, a switch mechanism in the circuit for said motor, a switch in said shunt circuit, means operated by said member for operating said switch and switch mechanism substantially simultaneously, and a manually operated switch for said motor circuit.

19. In an industrial truck, the combination of a wheel mounted frame, an upwardly extending guide frame thereon, a guide sheave for a flexible member, a second guide sheave for the flexible member supported at the upper end of said guide frame, an elevating member movably mounted on said guide frame, a hoisting means for said elevating member comprising a power driven drum and a flexible member arranged to wind on and off said drum at its inner end, engaging said sheaves and connected at its outer end to said elevating member, means for movably mounting said first mentioned sheave on one of said frames adjacent the lower portion of said guide frame to move in a direction substantially in a plane extending between the runs of said flexible member at opposite sides of said first mentioned sheave, and means normally acting on said sheave mounting means to move said sheave in a direction opposite to the pull thereon exerted by said flexible member.

In testimony whereof, I have hereunto subscribed my name.

EDWARD H. REMDE.

CERTIFICATE OF CORRECTION.

Patent No. 1,904,984.                                    April 18, 1933.

EDWARD H. REMDE.

It is hereby certified that error appears in the printed specification of the above numbered patent requiring correction as follows: Page 9, after line 27, insert the following as claim 1:

1. In apparatus of the class described, the combination of a wheel mounted frame, a guide frame thereon, an elevating member mounted for movement along said guide frame, a flexible member connected to said elevating member for moving it along said guide frame, a sheave at the upper end of said guide frame and around which said flexible member is reeved, a support movably mounted on one of said frames, a sheave carried by said support and around which said flexible member is reeved, means for winding up and paying out said flexible member, the pull on said flexible member operating through the sheave on said support to move the latter in one direction, and a spring normally acting on said support to move it in the opposite direction.; and for the present claim numbers reading from 1 to 19 consecutively read 2 to 20 consecutively; and that the said Letters Patent should be read with these corrections therein that the same may conform to the record of the case in the Patent Office.

Signed and sealed this 5th day of November, A. D. 1935.

Leslie Frazer
                                    Acting Commissioner of Patents.

(Seal)